United States Patent [19]

Chisholm

[11] Patent Number: 4,731,627

[45] Date of Patent: Mar. 15, 1988

[54] ENCLOSURE FOR LOADING FILM

[76] Inventor: Brian J. Chisholm, 517 Lee St., Apt. 3, Evanston, Ill. 60202

[21] Appl. No.: 150

[22] Filed: Jan. 2, 1987

[51] Int. Cl.⁴ ............ G03B 17/56

[52] U.S. Cl. ............ 354/308

[58] Field of Search ............ 354/308

[56] References Cited

U.S. PATENT DOCUMENTS 3,060,819 10/1962 Tohill ............ 354/308

FOREIGN PATENT DOCUMENTS 423456 4/1911 France ............ 354/308

*Primary Examiner*—Michael L. Gellner

*Attorney, Agent, or Firm*—Emrich & Dithmar

[57] ABSTRACT

A collapsible film loader having inner and outer light-impervious fabric shells connected to a light-impervious fabric floor around the periphery thereof defining an enclosure. An external support means is removably connected to the outer shell constructed and arranged to expand and support the inner and outer shells into a tent-like construction. A pair of light-impervious fabric sleeves are in communication with the enclosure extending from outside of the outer shell, and a door having a closure mechanism is in one side of the outer shell at least in partial registry with a door having a closure mechanism in the inner shell with light impervious fabric between the inner shell and the closure mechanism of the door in the outer shell.

15 Claims, 7 Drawing Figures

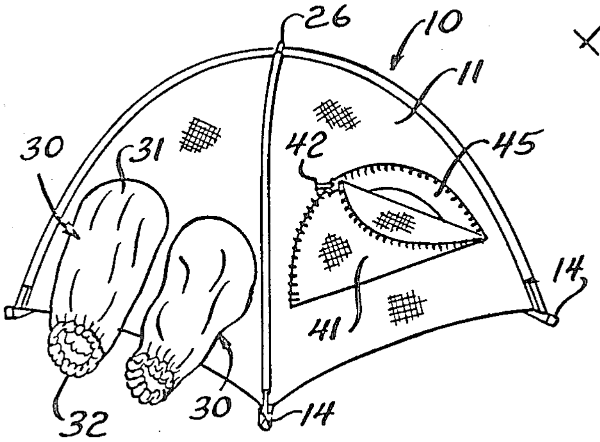
FIG. 1
FIG. 3
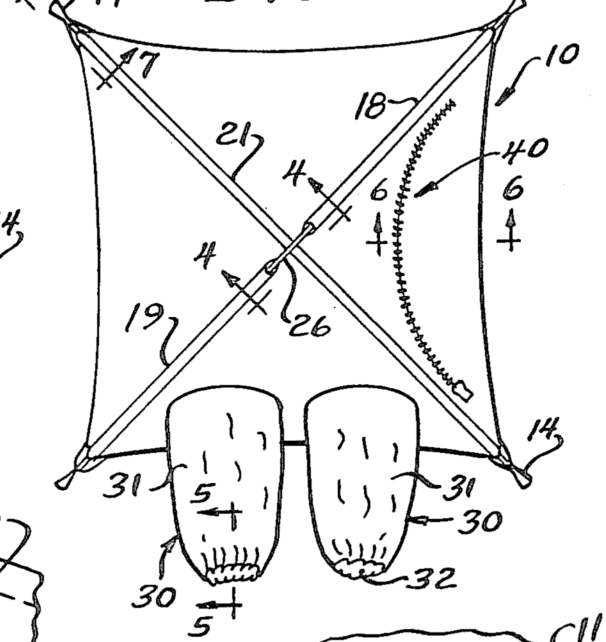
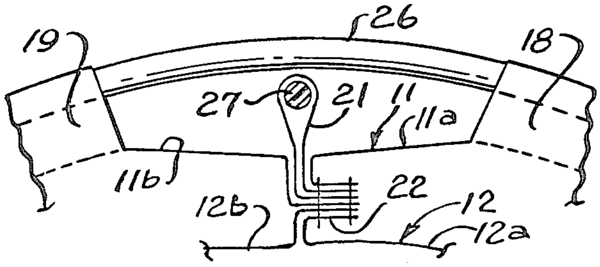
FIG. 4
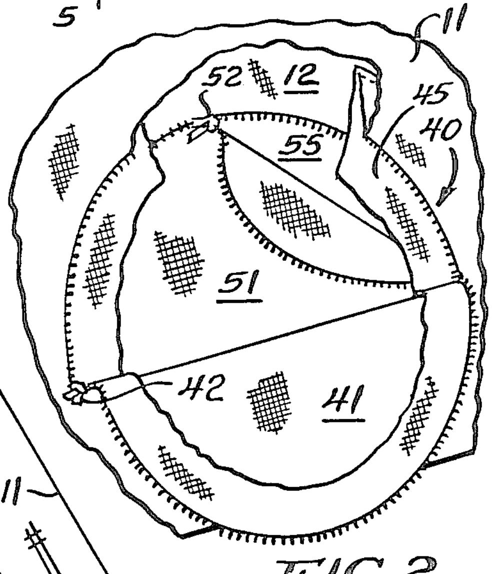
FIG. 2
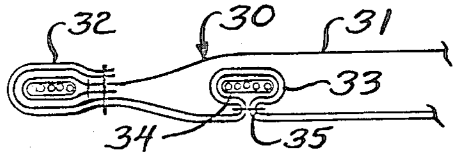
FIG. 5
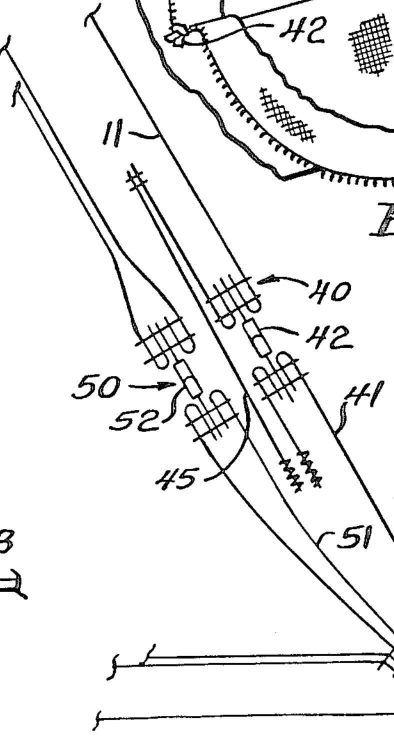
FIG. 6
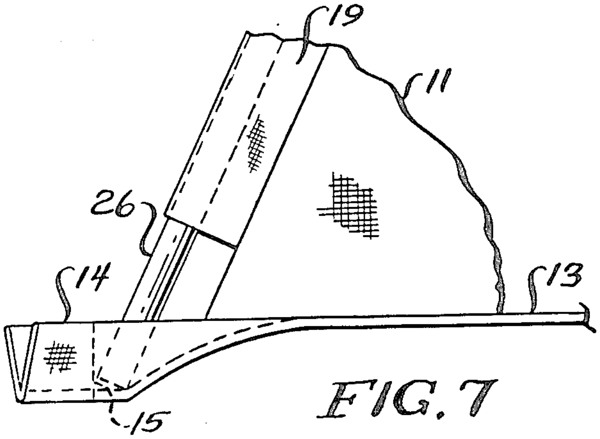
FIG. 7

ENCLOSURE FOR LOADING FILM

BACKGROUND OF THE INVENTION

This invention relates to a film loader which is portable and capable of being moved from site to site and is particularly useful for shooting on location. When shooting on location, cameramen often are required to change film frequently under adverse conditions far removed from a studio. In order to change film, it is required to have a light-free environment in which to work, and preferably one which is adequately spacious, easy to transport and absolutely free from light. Because shooting on location is expensive, it is imperative that no light enter the film loader to destroy the film, a condition which could not be discovered until subsequent to the location shooting, when the film is developed.

An object of this invention is to provide a collapsible film loader which is easily constructed on location and yet provides a spacious and absolutely light-free environment for loading or unloading film.

Yet another object of the invention is to provide a collapsible film loader comprising inner and outer light-impervious fabric shells connected to a light-impervious fabric floor around the periphery thereof defining an enclosure, external support means removably connected to the outer shell constructed and arranged to expand and support the inner and outer shells into a tent-like construction, a pair of light-impervious fabric sleeves in communication with the enclosure extending from outside of the outer shell, and a door having a closure mechanism in one side of the outer shell at least in partial registry with a door having a closure mechanism in the inner shell with light impervious fabric between the the inner shell and the closure mechanism of the door in the outer shell.

Another object of the invention is to provide a collapsible film loader comprising inner and outer light-impervious fabric shells connected to a light-impervious fabric floor around the periphery thereof defining an enclosure, two sheathes sewn to both the inner and outer fabric shells providing connection between the inner and outer shells, rod stopping means at each corner of the floor external of the outer fabric shell, two flexible rods each positioned in an associated sheathe providing external support to the fabric shells and expanding the shells into a tent-like construction, a pair of light-impervious fabric sleeves in communication with the enclosure extending from outside of the outer shell, and a door having a closure mechanism in one side of the outer shell at least in partial registry with a door having a closure mechanism in the inner shell with light impervious fabric between the the inner shell and the closure mechanism of the door in the outer shell.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

FIG. 1 is a perspective view of the film loader of the present invention in the erected condition thereof;

FIG. 2 is an enlarged elevational view of the door structure of the film loader illustrated in FIG. 1;

FIG. 3 is a top plan view of the film loader illustrated in FIG. 1;

FIG. 4 is an elevational view, partly in section, of the external support means of the loader illustrated in FIG. 3 as seen along lines 4—4 thereof;

FIG. 5 is a view in section of one of the sleeves of the film loader illustrated in FIG. 3 taken along line 5—5 thereof;

FIG. 6 is a view in section of the door construction of the film loader illustrated in FIG. 3 taken along line 6—6 thereof; and FIG. 7 is an enlarged elevational view of the corners of the collapsible film loader showing the positioning of the external support rods.

DESCRIPTION OF THE PREFERRED EMBODIMENTS

Referring to the Figures, there is seen a film loader 10 which is comprised of an outer shell 11 and an inner shell 12, the outer shell 11 being dome-like in shape comprised of a plurality of sections **11*a*, 11*b*, etc. with the inner shell 12 being of similar shape but smaller in overall size and also being comprised of various sections such as 12*a* and 12*b*, see FIG. 4. The outer shell 11 and the inner shell 12 are connected at the peripheries thereof to a bottom 13 forming an enclosure 55, as will be described. A gusset 14 is sewn at each corner of the bottom 13 by a seam 15, as seen in FIG. 7, for a purpose hereinafter set forth. The outer shell 11 and inner shell 12 are connected only at the periphery of the bottom 13 and at the spaced apart outer sheath sections 18 and 19 and the inner sheath section 21. Both the inner and outer sheath sections 18, 19 and sheath 21 are of the same general construction illustrated in FIG. 4 wherein the sheath 21 is shown to be a lapped piece of material positioned between the plies 11*a* and 11*b* of the outer shell 11 and the plies 12*a* and 12*b* of the inner shell 12 to provide a multi-ply seam 22 which serves to connect the outer shell 11 to the inner shell 12 and to provide the inner sheath 21. A similar construction is used for the outer sheath sections 18 and 19 but the outer sheath section are interrupted as illustrated in FIGS. 3 and 4 at the top of the film loader 10**.

Two flexible rods 26 and 27 are used to erect the film loader 10 with the outer rod 26 being slightly longer than the inner rod 27, the outer rod being positioned within the outer sheath sections 18 and 19 and the inner rod 27 being positioned within the inner sheath 21. Each of the rods 26, 27 is retained in a respective one of the corners 14 at the periphery by the corner gussets 14.

Provided in one side of the film loader 10 are a pair of sleeves 30, each including a body member 31 with an elastic cuff 32 and a second elastic band 34 positioned in a fold 33 in each of the sleeves 30. A sewn seam 35 maintains the elastic 34 in position. As noticed, the elastic cuffs 32 and the elastic 34 are longitudinally spaced apart sufficiently so as to prvide a close grip on a users arm when in the sleeves 30 to prevent any possible light infiltration into the enclosure 55 of the film loader 10 through the sleeves 30.

Entrance to the film loader 10 is provided by an outer door 40 and an inner door 50, the outer door 40 includes a semi-circular flap 41 connected to the outer shell 11 by means of a closure mechanism 42 which preferably is a zipper. A flap 45 is sewn behind the zipper 42 to prevent infiltration of light through the zipper 42 into the film loader 10. The inner door 50 has a semi-circular flap 51 in the inner shell 52 generally in registry with the flap 41, the flap 51 being closed by closure member, preferably a zipper 52. The flap 45 extends between the zipper 42 and and the zipper 52 thereby to ensure that no light infiltrates through the zippers when the doors 40 and 50 are closed. Inside the inner shell 12 is the enclosure 55 which is done-like in shape when the film loader 10 is constructed and erected as illustrated in FIG. 1.

Operation of the film loader 10 follows. When the film loader 10 is taken to the field, it is in a disassembled condition in which rods 26 and 27 have been removed from the construction as illustrated in FIG. 1, the remainder of the film loader 10 being simply of flexible cloth and easily folded into a small and easily transportable package. When at location, the film loader 10 is constructed as illustrated in FIG. 1 by inserting the rods 26 and 27 in the appropriate sheaths 18, 19 and 21 with each rod being trapped in appropriate gusset 14 at the corner of the bottom 13, thereby to expand the film loader 10 to its fully erected position. In the fully erected position, entry to the enclosure 55 is by two means, one being the pair of sleeves 30 and the other being through the outer door 40 and the inner door 50. New film, canisters, loading devices and the like can be positioned in the enclosure 55 through the outer door 40 and inner door 50 simply by unzipping the outer door 40 and thereafter opening inner door 50 in a similar manner. Protection hereinbefore described such as the flap 45 adequately ensures that no light enters the enclosure 55 when the doors 40 and 50 are enclosed.

The actual work of changing the film is performed in the enclosure by inserting the user's arms through the sleeves 30. Both the elastic cuffs 32 and the longitudinally spaced elastic 33 provide for a close fit around the person's arms to prevent any light entry into the enclosure 55. After the work has been performed, the work product may be removed through the doors 40 and 50 in the usual manner. Advantages of the film loader 10 include its construction with a three-ply white blackout material, of white on both sides sandwiching a black layer in between is used for the outer shell 11. The inner shell 12 is a two-ply material of black cotton mattise on the outside and a black rip stop nylon on the inside. The black rip stop nylon provides a smooth surface with very little lint production while the black cotton mattise provides a fabric barrier separate from the outer shell 11 which helps prevent any light entering the enclosure 55.

The rods 26 and 27 preferably are phenolic glass rods which are light weight, easy to bend, but regain their straight shape upon release from the constructed position shown in FIG. 1. The inner shell 12 is connected to the outer shell 11 only at the sheaths 18, 19 and 21 and at the elastic gathers of the arms 30, these being the cuffs 32 and the elastic 33. Accordingly, there are no common stitchings through which light can directly enter the enclosure 55. Since the inner shell 12 and the outer shell 11 are constructed so that the seams of the parts which make up each of the shells are not in registry with each other, there is little likelihood, if any, that light will enter the enclosure 55 even if a seam on the outer shell 11 separates due to stress or the like. A pair of nylon webs (not shown) extend across the bottom 13 from corner to corner so as to reduce the possibility that any stress caused by the resiliency of the rods 26 and 27 will cause the seams to separate. A major advantage of the film loader 10 is its small size in transport but its large size when erected in the field, permitting more than adequate room in which to work.

While there has been described what at present is considered to be the preferred embodiment of the present invention, it will be understood that various modifications and alterations may be made therein without departing from the true scope and spirit of the present invention which is intended to be covered in the claims appended hereto.

I claim:

1. A collapsible film loader comprising inner and outer light-impervious fabric shells connected to a light-impervious fabric floor around the periphery thereof defining an enclosure, external support means removably connected to said outer shell constructed and arranged to expand and support said inner and outer shells into a tent-like construction, a pair of light-impervious fabric sleeves in communication with said enclosure extending from outside of said outer shell, and a door having a closure mechanism in one side of said outer shell at least in partial registry with a door having a closure mechanism in said inner shell with light impervious fabric between the said inner shell and the closure mechanism of the door in said outer shell.

2. The collapsible film loader of claim 1, wherein outer light-impervious fabric shell is a three ply laminate containing a middle ply of black fabric.

3. The collapsible film loader of claim 1, wherein the inner light-impervious fabric shell is a two ply material with the inner ply being rip-stop nylon.

4. The collapsible film loader of claim 3, wherein the outer ply of the inner fabric shell is a black cotton mattise.

5. The collapsible film loader of claim 1, wherein each of the inner and outer fabric shells have sewn seams with the seams of each shell being offset with respect to the seams of the other shell.

6. The collapsible film loader of claim 1, wherein the closure mechanisms in the outer fabric door and the inner fabric door are zippers in partial registry with each other separated by a part circular flap of light-impervious fabric therebetween.

7. The collapsible film loader of claim 1, wherein sleeves are sewn to the outer shell being separate from the seams in the inner shell.

8. The collapsible film loader of claim 1, wherein each sleeve has longitudinally spaced apart elastic bands to prevent light from entering the enclosure through the sleeves.

9. A collapsible film loader comprising inner and outer light-impervious fabric shells connected to a light-impervious fabric floor around the periphery thereof defining an enclosure, two sheaths sewn to both the inner and outer fabric shells providing connection between said inner and outer shells, rod stopping means at each corner of said floor external of said outer fabric shell, two flexible rods each positioned in an associated sheathe providing external support to said fabric shells and expanding said shells into a tent-like construction, a pair of light-impervious fabric sleeves in communication with said enclosure extending from outside of said outer shell, and a door having a closure mechanism in one side of said outer shell at least in partial registry with a door having a closure mechanism in said inner shell with light impervious fabric between the said inner shell and the closure mechanism of the door in said outer shell.

10. The collapsible film loader of claim 9, wherein said sheathes are sewn between said inner and outer shells to prevent light from entering through the seam formed thereby.

11. The collapsible film loader of claim 10, wherein said inner and outer shells are seamed at the meeting of said inner and outer shells and said sheathes to form a multiply seam of six layers.

12. The collapsible film loader of claim 9, wherein each sleeve has longitudinally spaced apart elastic bands to prevent light from entering the enclosure through the sleeves.

13. The collapsible film loader of claim 9, wherein outer light-impervious fabric shell is a three ply laminate containing a middle ply of black fabric and the inner light-impervious fabric shell is a two ply material with the inner ply being rip-stop nylon and the outer ply of the inner fabric shell is a black cotton mattise.

14. The collapsible film loader of claim 9, wherein each of the inner and outer fabric shells have sewn seams with the seams of each shell being offset with respect to the seams of the other shell.

15. The collapsible film loader of claim 9, wherein the closure mechanisms in the outer fabric door and the inner fabric door are zippers in partial registry with each other separated by a part circular flap of light-impervious fabric therebetween.

* * * * *

UNITED STATES PATENT AND TRADEMARK OFFICE
CERTIFICATE OF CORRECTION

PATENT NO. : 4,731,627
DATED : March 15, 1988
INVENTOR(S) : Brian J. Chisholm

It is certified that error appears in the above-identified patent and that said Letters Patent is hereby corrected as shown below:

Claim 7, column 4, line 45, after "shell" insert --and to the inner shell with the seams in the outer shell--.

Signed and Sealed this

Nineteenth Day of July, 1988

*Attest:*

DONALD J. QUIGG

*Attesting Officer* *Commissioner of Patents and Trademarks*